Figure 1:
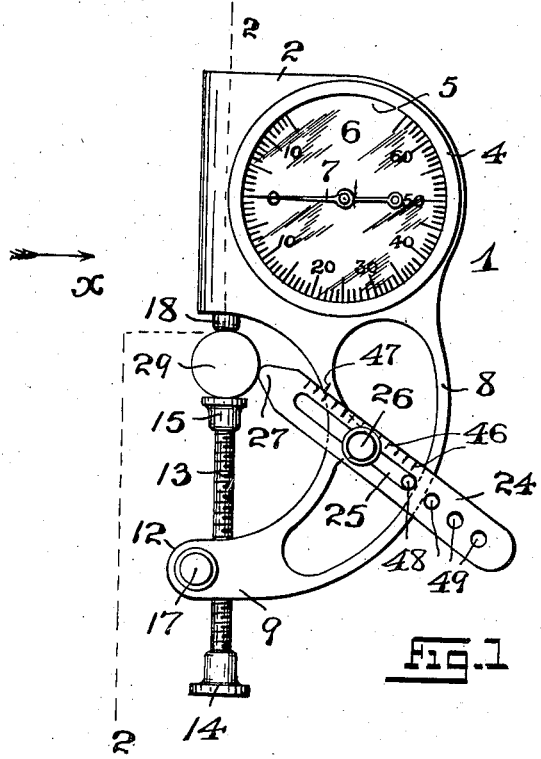

H. J. AND F. W. HORSTMANN.
INDICATING CALIPER.
APPLICATION FILED OCT. 21, 1920.

1,436,656.

Patented Nov. 28, 1922.

INVENTORS:
Henry J. Horstmann and
Frederick W. Horstmann,
BY
Fraentzel and Richards,
ATTORNEYS.

Patented Nov. 28, 1922.

1,436,656

UNITED STATES PATENT OFFICE.

HENRY J. HORSTMANN, OF NEWARK, AND FREDERICK W. HORSTMANN, OF KEARNY, NEW JERSEY.

INDICATING CALIPER.

Application filed October 21, 1920. Serial No. 418,425.

*To all whom it may concern:*

Be it known that we, HENRY J. HORSTMANN and FREDERICK W. HORSTMANN, citizens of the United States, residing at Newark, in the county of Essex and State of New Jersey, and at Kearny, county of Hudson and State of New Jersey, respectively, have invented certain new and useful Improvements in Indicating Calipers; and we do hereby declare the following to be a full, clear and exact description of the invention, such as will enable others skilled in the art to which it appertains to make and use the same, reference being had to the accompanying drawings, and to characters of reference marked thereon, which form a part of this application.

This invention relates, generally, to improvements in measuring devices or gages; and, the present invention has reference, more particularly, to an improved indicating gage or caliper, which is initially set to a standard master-piece to which other pieces are to be made, by lathe-turning, or otherwise, the device comprising in general a main body, usually termed the beam which is provided with an adjustably fixed contact point and a movable contact point, between which the masterpiece is placed to move an indicating finger upon a dial to zero-point, after which the device can be used for calipering other pieces which are to be made in exact duplicate of the masterpiece.

The present invention is in the nature of a device or implement which is an improvement of the indicating caliper for which Letters-Patent No. 1,300,837 were granted April 15th, 1919, to Frederick William Horstmann, and this invention has for its principal object, by additional improvements to the indicating caliper shown and described in said Letters-Patent to provide a more positively and delicately acting, as well as a more efficiently operating tool or implement is the result.

Other objects of the present invention not at this time more particularly enumerated will be clearly understood from the following detailed description of the present invention.

With the various objects of the present invention in view, the said invention consists, primarily, in the novel indicating caliper hereinafter more fully set forth; and, the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The present invention is illustrated in the accompanying drawings, in which:—

Figure 2:
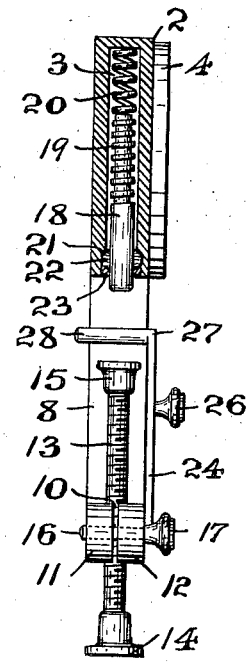

Figure 1 is an elevation of an indicating caliper, with the true masterpiece shown inserted between the adjustably fixed contact point and the other movable contact point, the dial indicating the unit or zero position of the pointer, said view showing one embodiment of the principles of the present invention; and Figure 2 is a vertical sectional representation of the said tool or implement, said section being represented as being taken on line 2—2 in said Figure 1, looking in the direction of the arrow X.

Figure 3:
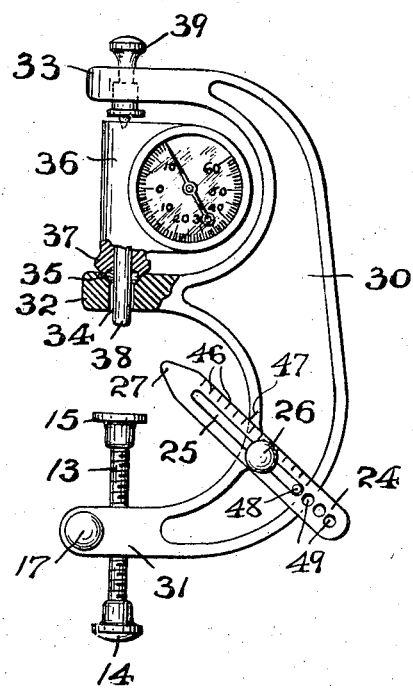
Figure 4:
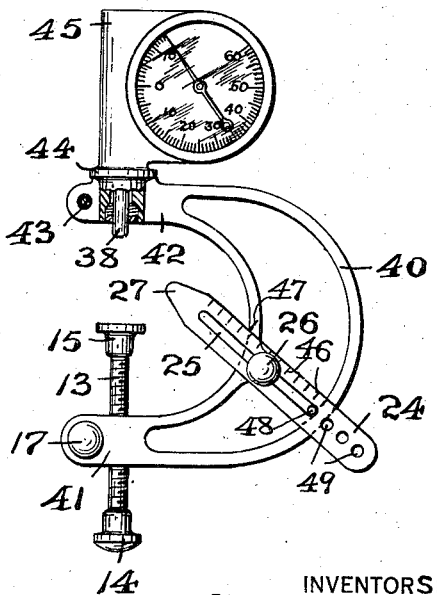

Figures 3 and 4 are elevations of slightly modified forms of indicating calipers made according to and embodying the principles of the present invention, certain parts being represented in section.

Similar characters of reference are employed in the said above described views, to indicate corresponding parts.

Referring now to the said drawings, and more especially to Figures 1 and 2, the reference-character 1 indicates the main body of the tool or implement, the same being termed the beam, the upper portion 2 of the same being formed with a chamber 3, in which is movably disposed, in the manner to be presently described, the movably contact member hereinabove mentioned. One side of said upper portion 2 is provided substantially in the manner of said Letters-Patent No. 1,300,837, with an opening which is surrounded by a bezel 4, or other suitable fastening means, for securing over said opening a protecting crystal or glass 5. Back of said crystal or glass is a dial 6, having graduations which are marked as shown in the drawings, an index-finger 7 being movably disposed above said dial, said index-finger being actuated or moved by means of the mechanism described in said Patent No. 1,300,837, but not shown in connection with the drawings accompanying this application.

As shown in said Figure 1 of the drawings, the said beam 1 also comprises an arc-shaped or other suitably formed extension, as 8, which terminates in a forwardly projecting extension 9, said extension being split at its free end-portion, as at 10, so as to provide a pair of binding members 11 and 12. These members 11 and 12 are provided adjacent to the slit 10, with internally screw-threaded parts in which is rotatably and adjustably disposed the screw-threaded shank 13 of a stem, termed the adjustably fixed contact point, said shank 13 being provided at one end with a fingerpiece 14 and at its other end with a contact-head or enlargement, as 15. Extending laterally through the said binding members 11 and 12, suitably in front of the said shank 13 is a binding or set-screw 16 provided with a fingerpiece 17 for forcing the two members 11 and 12 positively into binding engagement with the shank 13 after adjustment of the latter, so as to fix the adjusted shank against movement, as will be evident and for the purposes to be presently more fully described. The previously mentioned movable contact-point or member consists, essentially, of a stem 18 which is provided with a rack-portion or worm, as 19, in active engagement of the index-finger actuating mechanism of said Letters Patent No. 1,300,837, said stem and its rack-portion being movably disposed in the chamber 3, against the action of a coiled spring 20, which is placed above the said rack-portion or worm 19, as shown in Figure 2 of the drawings. It will also be seen, that the contacting end-portion of the stem 18 extends from an enlarged open portion 21, the stem being movably disposed in a lubricated packing 22 retained in said open portion 21 by a retaining guide-disc or plate, as 23. If desired, the beam 1 may be provided with a guard in the form of a plate 24 provided with an elongated opening 25 for movably mounting said plate upon a set-screw 26, and by means of which the said plate can be desirably secured in adjusted relation to the side of the extension 8 of the beam, as will be clearly understood. The forward end-portion of the said plate 24 is preferably of the configuration shown, as at 27, said end-portion having extending laterally therefrom, so as to project into the space, formed by the upper portion 2 and the extension 9, a finger 28, or other suitable means, to provide a stop against which the masterpiece 29, or the piece of work which is to be calipered, is adapted to be placed, as clearly illustrated in Figure 1 of the drawings.

Having in the foregoing described in a general manner, the device shown in said Figures 1 and 2 of the drawings, we will briefly set forth the manner of using the same.

Normally, when the tool is not in use, the index-finger 7 registers with the last graduation, being in this case graduation "15" located above the zero-mark. The stem 13 is sufficiently turned back or screwed down between the two binding members 11 and 12, which have previously been brought into non-binding relation by unscrewing the binding screw 17, whereby said members 11 and 12 act as a nut. The masterpiece 29 is now properly placed between the contact end of the stem 18 and the contact-head 15 of the screw-threaded shank 13. By means of the fingerpiece 14, the shank or stem 13 is now turned in the nut formed by the members 11 and 12, thereby moving the contact-head 15 against the masterpiece 29, and the latter moving against the contact-end of the stem 18, moving said stem 18 further into the chamber 3, and compressing the spring 20. The rack-portion or worm of the stem 18 operates the index-hand actuating mechanism, in the manner of said previously-mentioned Letters-Patent, No. 1,300,837, until the index-hand or finger registers with the zero-mark upon the dial, at which time the operator ceases to turn the shank or stem 13. The shank or stem 13 is now immovably fixed by tightening the set-screw 17, so as to cause the two members 11 and 12 to tightly clamp the said shank or stem 13. The binding-screw 26 having also been previously loosened, the plate 24 is moved upon the shank of said screw 26, until its stop-finger 28 is brought against the master-piece 29, whereby the plate 24 is immovably fixed in its fixed position by tightening the binding-screw 26. The master-piece 29 is now removed, whereupon the spring 30 again causes the stem 18 and the index-hand 7 to return to their initial positions.

The device is now ready for calipering the piece of work which is to be produced and which is to correspond in measurement to the masterpiece.

The piece of work, when inserted between the contact-end of the movable stem 18 and the contact-head 15 of the fixed shank or stem 13 and against the fixed stop-finger 28, if in exact size of the masterpiece, will have effect upon the movable stem to such a degree that the index-hand will register with the zero-mark, but if the hand points to a graduation above the zero-mark, it shows that the worked piece has been made smaller than the masterpiece; if, however, the index-hand registers with a graduation beyond and below the zero-mark, then the device will indicate to the workman that the work is still larger than the masterpiece, the indicated excess graduations designating to him just how much more has to be removed from the piece which is being worked upon, to make it correspond to the exact size of the master-piece.

Referring now to Figure 3 of the drawings, the reference-character 30 indicates a beam, provided with a series of forwardly projecting extensions, as 31, 32 and 33, vertically in alinement with each other, the extension 31 being split in the manner as herein-above described to provide a pair of binding members between which the above described screw-threaded shank or stem 13 is arranged and can be operated in the manner stated, and immovably fixed in place by the set-screw 17. The extension 32 is provided with a tubular hole, as 34, preferably formed with a cone-shaped seating-portion 35, upon which is rotatably disposed a cone-shaped supporting member, as 37, which forms a part of a chambered casing or body 36, provided with a spring-actuated movable contact-stem 37, similar to the movable stem herein-before described in connection with the construction illustrated in said Figures 1 and 2 of the drawings. The said chambered casing or body 36 is rotatably held between the said extensions 32 and 33 by the said supporting member 37 and a suitably constructed stud, as 39, connected with the extension 33 and engaging the said casing or body 36 in the manner shown in said Figure 3. The arrangement of the dial, its index-hand, and the index-hand actuating mechanism, as well as the manner of using the device, is the same as that described in connection with the construction illustrated in said Figures 1 and 2.

Another form of gage or indicating caliper, embodying the principles of the present invention is illustrated in Figure 4 of the drawings, the general arrangements and constructions of the devices and parts being similar to those described in said Figure 3. The beam 40 in this case is made with but two extensions 41 and 42, the extension 41 being employed for carrying the adjustably fixed contact member 13 and the extension 42 being slitted and provided with a binding screw 43, for clamping the supporting member 44 of the chambered casing 45 in a fixed position, after rotation, as will be clearly understood from an inspection of said Figure 4.

In all other respects, the construction, operation, and use of the device is the same as that described in connection with the devices illustrated in said Figures 1, 2 and 3 of the drawings.

Of course, we are aware, that changes may be made in the general arrangements and combinations of the various devices and parts, as well as in the details of the construction of the said parts, without departing from the scope of the present invention as set forth in the foregoing specification, and as defined in the clauses of the claims which are appended to the said specification. Hence, we do not limit our invention to the exact arrangements and combinations of the several devices and parts as described in the said specification, nor do we confine ourselves to the exact details of the construction of the said parts, as illustrated in the accompanying drawings.

We claim:—

1. An indicating caliper comprising a beam, a chambered body connected with said beam, said beam having a slitted extension providing a pair of binding members having screw-threaded parts, a contact-member movably and adjustably disposed in said screw-threaded parts, means connected with said binding members for clamping said contact-member in a fixed position, a dial, and an index-finger movably disposed within said chambered body, and a second movable contact-member within said chambered body and co-operating with said index-finger for moving the same, said second-mentioned contact-member comprising a contact stem, a lubricating packing and a perforated retaining disc surrounding the said last-mentioned contact-stem.

2. An indicating caliper comprising a beam, a chambered body connected with said beam, said beam having a slitted extension providing a pair of binding members having screw-threaded parts, a contact-member movably and adjustably disposed in said screw-threaded parts, a laterally extending binding screw connected with said binding members for clamping said contact-members in a fixed position, a dial, and an index-finger, movably disposed within said chambered body, and a second movable contact member within said chambered body and co-operating with said index-finger for moving the same, said second-mentioned contact-member comprising a contact-stem, and a lubricating packing and a perforated retaining disc surrounding the said last-mentioned contact-stem.

3. An indicating caliper comprising a beam, a chambered body containing a dial and index-finger, said chambered body being rotatably mounted upon said beam, said beam being also provided with a slitted extension providing a pair of binding members having screw-threaded parts, a contact-member movably and adjustably disposed in said screw-threaded parts, and a second movable contact-member within said chambered body and co-operating with said index-finger for moving the same, said second-mentioned contact-member comprising a contact stem, a lubricating packing and a perforated retaining disc surrounding the said last-mentioned contact-stem.

4. An indicating caliper comprising a beam, a chambered body connected with said beam, said beam having a slitted extension providing a pair of binding members having screw-threaded parts, a contact-member movably and adjustably disposed in said screw-threaded parts, means connected with said binding members for clamping said contact-member in a fixed position, a dial and an index-finger movably disposed within said chambered body, and a second movable contact-member within said chambered body and cooperating with said index-finger for moving the same, combined with a slotted plate adjustably disposed upon the side of said beam, means for securing said plate in a fixed position, and a stop-finger connected with and extending laterally from said plate.

5. An indicating caliper comprising a beam, a chambered body connected with said beam, said beam having a slitted extension providing a pair of binding members having screw-threaded parts, a contact-member movably and adjustably disposed in said screw-threaded parts, means connected with said binding members for clamping said contact-member in a fixed position, a dial, and an index-finger movably disposed within said chambered body, and a second movable contact-member within said chambered body and co-operating with said index-finger for moving the same, a lubricating packing and a perforated retaining disc surrounding the said last-mentioned contact-stem, combined with a slotted plate adjustably disposed upon the side of said beam, means for securing said plate in a fixed position, and a stop-finger connected with and extending laterally from said plate.

6. An indicating caliper comprising a beam, a chambered body connected with said beam, said beam having a slitted extension providing a pair of binding members having screw-threaded parts, a contact-member movably and adjustably disposed in said screw-threaded parts, a laterally extending binding screw connected with said binding members for clamping said contact-member in a fixed position, a dial, and an index-finger movably disposed within said chambered body, and a second movable contact member within said chambered body and co-operating with said index-finger for moving the same, combined with a slotted plate adjustably disposed upon the side of said beam, means for securing said plate in a fixed position, and a stop-finger connected with and extending laterally from said plate.

7. An indicating caliper comprising a beam, a chambered body connected with said beam, said beam having a slitted extension providing a pair of binding members having screw-threaded parts, a contact-member movably and adjustably disposed in said screw-threaded parts, a laterally extending binding screw connected with said binding members for clamping said contact-member in a fixed position, a dial, and an index-finger movably disposed within said chambered body, and a second movable contact member within said chambered body and co-operating with said index-finger for moving the same, said second-mentioned contact-member comprising a contact-stem, a lubricating packing and a perforated retaining disc surrounding the said last-mentioned contact-stem, combined with a slotted plate adjustably disposed upon the side of said beam, means for securing said plate in a fixed position, and a stop-finger connected with and extending laterally from said plate.

8. An indicating caliper comprising a beam, a chambered body containing a dial and index-finger, said chambered body being rotatably mounted upon said beam, and adjustably fixed contact-member connected with said beam, and a second contact-member movably disposed within said chambered body and co-operating with said index-finger for moving the same, combined with a slotted plate adjustably disposed upon the side of said beam, means for securing said plate in a fixed position, and a stop-finger connected with and extending laterally from said plate.

9. An indicating caliper comprising a beam, a chambered body containing a dial and index-finger, said chambered body being rotatably mounted upon said beam, said beam being also provided with a slitted extension providing a pair of binding members having screw-threaded parts, a contact-member movably and adjustably disposed in said screw-threaded parts, and a second movable contact-member within said chambered body and co-operating with said index-finger for moving the same, said second-mentioned contact-member comprising a contact-stem, a lubricating packing and a perforated retaining disc surrounding the said last-mentioned contact-stem, combined with a slotted plate adjustably disposed upon the side of said beam, means for securing said plate in a fixed position, and a stop-finger connected with and extending laterally from said plate.

10. An indicating caliper comprising a beam, a chambered body containing a dial and index-finger, said chambered body being rotatably mounted upon said beam, said beam being also provided with a slitted extension providing a pair of binding members having screw-threaded parts, a contact-member movably and adjustably disposed in said screw-threaded parts, a laterally extending binding screw connected with said binding members for clamping said contact-member in a fixed position, and a second movable contact-member within said chambered body and co-operating with said index-finger for moving the same, combined with a slotted plate adjustably disposed upon the side of said beam, means for securing said plate in a fixed position, and a stop-finger connected with and extending laterally from said plate.

In testimony, that we claim the invention set forth above we have hereunto set our hand this 29th day of September, 1920.

HENRY J. HORSTMANN.
FREDERICK W. HORSTMANN.

Witnesses:
   EARL L. HORSTMANN,
   HENRY N. SINCOCK.